(12) United States Patent
Saby et al.

(10) Patent No.: US 11,836,514 B2
(45) Date of Patent: Dec. 5, 2023

(54) SYSTEM AND METHOD OF UTILIZING MEMORY MEDIUM FAULT RESILIENCY WITH SECURE MEMORY MEDIUM PORTIONS

(71) Applicant: Dell Products L.P., Round Rock, TX (US)

(72) Inventors: Vinod Parackal Saby, Bangalore (IN); Krishnaprasad Koladi, Bengaluru (IN); Gobind Vijayakumar, Trichy (IN)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 17/152,115

(22) Filed: Jan. 19, 2021

(65) Prior Publication Data

US 2022/0229565 A1 Jul. 21, 2022

(51) Int. Cl.
*G06F 9/455* (2018.01)
*G06F 11/30* (2006.01)
(Continued)

(52) U.S. Cl.
CPC ...... *G06F 9/45558* (2013.01); *G06F 11/0772* (2013.01); *G06F 11/1446* (2013.01);
(Continued)

(58) Field of Classification Search
CPC .... G06F 3/0619; G06F 3/0622; G06F 3/0631; G06F 3/0637; G06F 3/065; G06F 3/0679;
(Continued)

(56) References Cited

U.S. PATENT DOCUMENTS

| 7,076,690 B1 * | 7/2006 | Todd | G06F 11/2094 |
| | | | 714/13 |
| 10,872,152 B1 * | 12/2020 | Martel | G06F 21/31 |

(Continued)

OTHER PUBLICATIONS

DMTF, "Common Information Model", retrieved Jan. 3, 2021 via the WayBack Machine, <http://web.archive.org/web/20210103180519/https://www.dmtf.org/standards/cim> (Year: 2021).*

(Continued)

*Primary Examiner* — Reginald G Bragdon
*Assistant Examiner* — Aaron D Ho
(74) *Attorney, Agent, or Firm* — McDermott Will & Emery LLP

(57) ABSTRACT

In one or more embodiments, one or more systems, one or more methods, and/or one or more processes may receive a request for a secure memory region with fault resiliency from first processor instructions being executed at a first processor privilege level; allocate a first enclave, in which the first enclave protects at least one of second processor instructions and data from being read by and from being altered by third processor instructions executing at a second processor privilege level; allocate a second enclave, in which the second enclave protects the at least one of the second processor instructions and the data from being read by and from being altered by the second processor instructions; store the at least one of the second processor instructions and the data in the first enclave; and mirror the at least one of the second processor instructions and the data in the second enclave.

20 Claims, 4 Drawing Sheets

(51) Int. Cl.
  *G06F 11/07* (2006.01)
  *G06F 12/14* (2006.01)
  *G06F 11/14* (2006.01)
  *G06F 12/02* (2006.01)

(52) U.S. Cl.
  CPC .......... *G06F 11/3037* (2013.01); *G06F 12/02* (2013.01); *G06F 12/1416* (2013.01); *G06F 2009/45583* (2013.01)

(58) Field of Classification Search
  CPC ............... G06F 3/0688; G06F 9/45558; G06F 2009/45583; G06F 11/0772; G06F 11/1446; G06F 11/3037; G06F 12/02; G06F 12/14; G06F 12/1416; G06F 12/1491
  USPC ....................................................... 711/163
  See application file for complete search history.

(56) References Cited

U.S. PATENT DOCUMENTS

| | | | |
|---|---|---|---|
| 11,086,780 B1* | 8/2021 | Glimcher | G06F 11/2056 |
| 2006/0015946 A1* | 1/2006 | Yagawa | G06F 21/80 726/32 |
| 2016/0224259 A1* | 8/2016 | Ahrens | G06F 3/067 |
| 2016/0283404 A1* | 9/2016 | Xing | G06F 12/1408 |
| 2016/0283731 A1* | 9/2016 | Chow | G06F 21/6263 |
| 2017/0177449 A1* | 6/2017 | Bronk | H04L 63/062 |
| 2017/0372076 A1* | 12/2017 | Poornachandran | H04L 9/3268 |
| 2019/0158594 A1* | 5/2019 | Shadmon | H04L 67/01 |
| 2019/0243950 A1* | 8/2019 | Soriente | G06F 21/577 |
| 2019/0278913 A1* | 9/2019 | Ndu | H04L 9/0841 |
| 2019/0370470 A1* | 12/2019 | Yao | G06F 21/575 |
| 2019/0377598 A1* | 12/2019 | Xia | G06F 21/602 |
| 2020/0153629 A1* | 5/2020 | Yitbarek | H04L 9/0897 |
| 2021/0021580 A1* | 1/2021 | McCallum | H04L 63/10 |
| 2021/0035249 A1* | 2/2021 | Kohari | G06N 20/00 |
| 2021/0144170 A1* | 5/2021 | Ganapathy | H04L 63/1475 |
| 2021/0232676 A1* | 7/2021 | Gingell | G06F 21/6245 |
| 2021/0279353 A1* | 9/2021 | Du | G06F 12/1425 |
| 2021/0399876 A1* | 12/2021 | Ghosh | H04L 9/0637 |
| 2022/0012042 A1* | 1/2022 | Doshi | H04L 9/0819 |
| 2022/0207187 A1* | 6/2022 | Constable | G06F 21/57 |

OTHER PUBLICATIONS

Kanakos, Mike, "Get-CIMInstance Vs Get-WMIObject: What's The Difference?", Posted Oct. 31, 2019, hosted by Progress (formerly ipswitch), <https://www.ipswitch.com/blog/get-ciminstance-vs-get-wmiobject-whats-the-difference> (Year: 2019).*

Schneider, Moritz, Aritra Dhar, Ivan Puddu, Kari Kostiainen, and Srdjan Capkun. "Pie: A dynamic tcb for remote systems with a platform isolation environment." arXiv preprint arXiv:2010.10416 (2020). (Year: 2020).*

B.C. Xing, M. Shanahan, and R. Leslie-Hurd. 2016. Intel® Software Guard Extensions (Intel® SGX) Software Support for Dynamic Memory Allocation inside an Enclave. In Proceedings of the Hardware and Architectural Support for Security and Privacy 2016 (HASP 2016). (Year: 2016).*

F. McKeen, I. Alexandrovich, I. Anati, D. Caspi, S. Johnson, R. Leslie-Hurd, and C. Rozas. 2016. Intel® Software Guard Extensions (Intel® SGX) Support for Dynamic Memory Management Inside an Enclave. In Proceedings of the Hardware and Architectural Support for Security and Privacy 2016 (HASP 2016) (Year: 2016).*

Techopedia, "Non-Uniform Memory Access (NUMA)", retrieved Apr. 4, 2018 via the WayBack Machine. <http://web.archive.org/web/20180404145024/https://www.techopedia.com/definition/4617/non-uniform-memory-access-numa> (Year: 2018).*

IEEE, "The Authoriattive Dictionary of IEEE Standards Terms", 7th edition, 2000, pp. i-x, 339 (Year: 2000).*

Costan, V., Lebedev, I., & Devadas, S. (2016). Sanctum: Minimal hardware extensions for strong software isolation. In 25th USENIX Security Symposium (USENIX Security 16) (pp. 857-874). (Year: 2016).*

L. J. Gunn, J. Liu, B. Vavala and N. Asokan, "Making Speculative BFT Resilient with Trusted Monotonic Counters," 2019 38th Symposium on Reliable Distributed Systems (SRDS), Lyon, France, 2019, pp. 133-13309, doi: 10.1109/SRDS47363.2019.00024. (Year: 2019).*

Ehnes, Daniel "The Magic of Intel's SGX." Retrieved from url: https://medium.com/magicofc/the-magic-of-intels-sex-how-to-hello-it-sec-world-fb0295d6c33b, Nov. 21, 2018.

* cited by examiner

SYSTEM AND METHOD OF UTILIZING MEMORY MEDIUM FAULT RESILIENCY WITH SECURE MEMORY MEDIUM PORTIONS

BACKGROUND

Field of the Disclosure

This disclosure relates generally to information handling systems and more particularly to utilizing memory medium fault resiliency with secure memory medium portions.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive a request for a secure memory region with fault resiliency from first processor instructions being executed by a processor of an information handling system at a first processor privilege level; and may determine if multiple non-uniform memory access nodes exist. If the multiple non-uniform memory access nodes do not exist, the one or more systems, the one or more methods, and/or the one or more processes may further: allocate a first enclave via a first volatile memory medium associated with a first non-uniform memory access node that includes the first volatile memory medium, in which the first enclave protects at least one of second processor instructions and data from being read by and from being altered by third processor instructions executing at a second processor privilege level, higher than the first processor privilege level; and allocate a second enclave via the first volatile memory medium, in which the second enclave protects the at least one of the second processor instructions and the data from being read by and from being altered by the third processor instructions executing at the second processor privilege level. If the multiple non-uniform memory access nodes exist, the one or more systems, the one or more methods, and/or the one or more processes may further: allocate the first enclave via the first volatile memory medium associated with the first non-uniform memory access node that includes the first volatile memory medium; and allocate the second enclave via a second volatile memory medium associated with a second non-uniform memory access node that includes the second volatile memory medium.

In one or more embodiments, the one or more systems, the one or more methods, and/or the one or more processes may further: store the at least one of the second processor instructions and the data in the first enclave; and mirror the at least one of the second processor instructions and the data in the second enclave. In one or more embodiments, the one or more systems, the one or more methods, and/or the one or more processes may further: determine that additional data is stored in the first enclave; and mirror the additional data in the second enclave. For example, determining that additional data is stored in the first enclave; and mirror the additional data in the second enclave may be performed in response to determining that the additional data is stored in the first enclave.

In one or more embodiments, the one or more systems, the one or more methods, and/or the one or more processes may further: determine that a fault occurred with at least one of the first memory medium and the first enclave; determine that access of the at least one of the second processor instructions and the data has been requested; and provide at least a portion of the at least one of the second processor instructions and the data from the second enclave. In one or more embodiments, the third processor instructions executing at the second processor privilege level may include at least one of a virtual machine and an operating system virtualization instance.

In one or more embodiments, the one or more systems, the one or more methods, and/or the one or more processes may further determine that the request for the secure memory region with the fault resiliency includes an attribute that is set to indicate that the at least one of the second processor instructions and the data in the second enclave are to be mirrored in the second enclave. In one or more embodiments, receiving the request for the secure memory region with fault resiliency from the first processor instructions may include an operating system enclave driver receiving the request for the secure memory region with fault resiliency from the first processor instructions. For example, the one or more systems, the one or more methods, and/or the one or more processes may further provide, by the operating system enclave driver, the request for the secure memory region with fault resiliency to information handling system firmware via at least one of a Windows Management Interface (WMI) and a Common Information Model (CIM).

In one or more embodiments, the one or more systems, the one or more methods, and/or the one or more processes may further: create, by an operating system enclave driver, a data structure configured to store a list of enclaves that have been requested for redundancy; receive, by the operating system enclave driver, a request for additional storage space for the secure memory region; extend, by the operating system enclave driver, the first enclave to include the additional storage space for the secure memory region; extend, by the operating system enclave driver, the second enclave to include the additional storage space for the secure memory region; and modify, by the operating system enclave driver, the data structure to include an indication of the additional storage space for the secure memory region.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
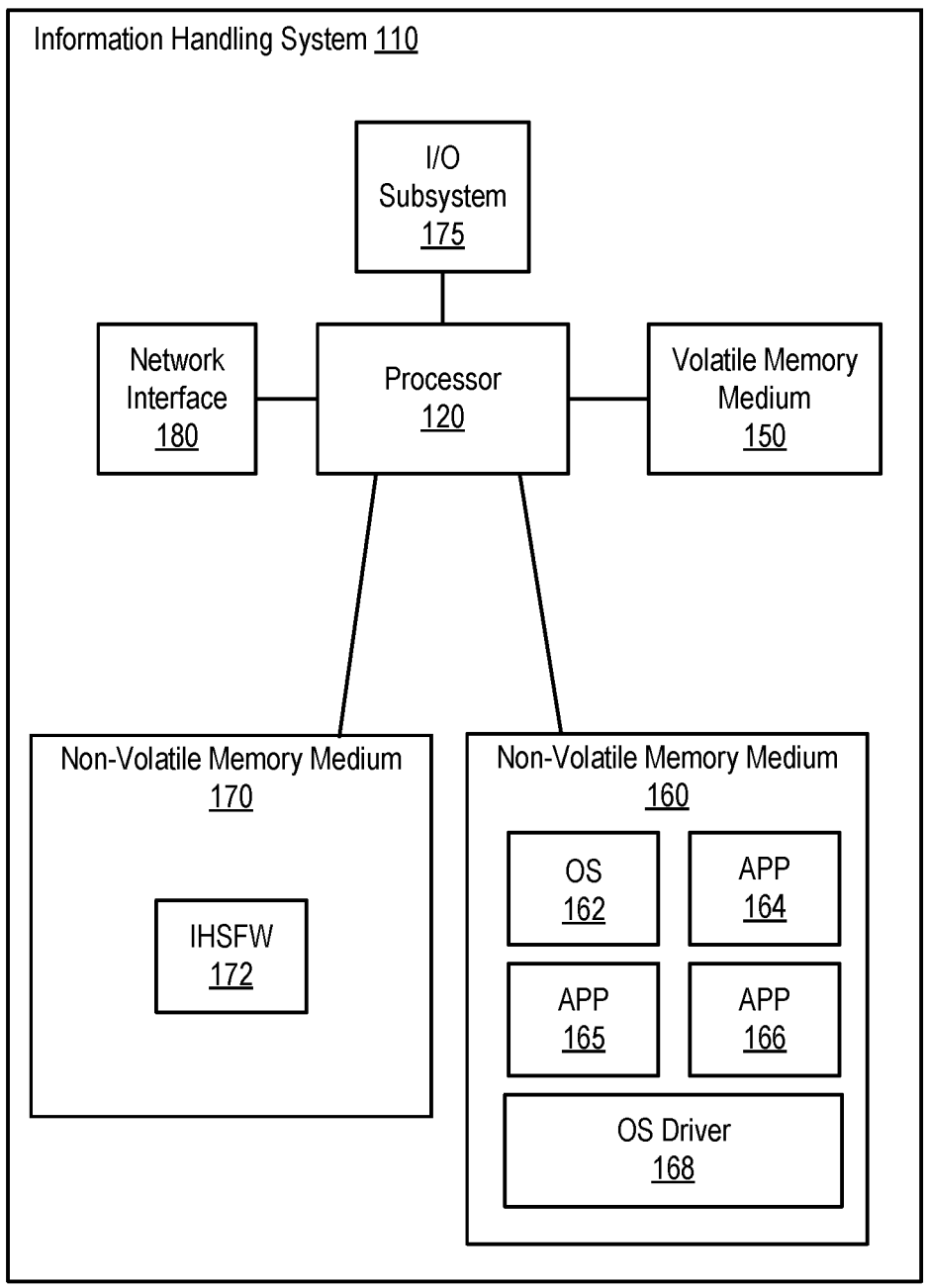
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more systems, one or more methods, and/or one or more processes may isolate and may encrypt processor instructions and data in a memory medium. For example, the one or more systems, the one or more methods, and/or the one or more processes may utilize hardware-based encryption of a portion of the memory medium to isolate and encrypt the processor instructions and the data in the memory medium. For instance, a processor of an information handling system may provide the hardware-based encryption of the portion of the memory medium to isolate and encrypt the processor instructions and the data in the memory medium.

In one or more embodiments, hardware-based encryption may permit user-level processor instructions to allocate one or more private portions of a memory medium. A private portion of the memory medium may be referred to as an enclave. For example, an enclave may protect processor instructions and/or data from being read by and/or from being altered by a process executing at a higher processor privilege level. For instance, an enclave may store application processor instructions (e.g., an application executable by a processor), one or more certificates, one or more private encryption keys, and/or one or more hash values, among others, which should be accessed by authorized operating system processes and/or by authorized processor instructions. In one or more embodiments, the processor of the information handling system may utilize one or more structures and/or one or more functionalities of INTEL® software guard extensions (SGX) to isolate and encrypt processor instructions and/or data in a memory medium. For example, the processor of the information handling system may utilize one or more structures and/or one or more functionalities of INTEL® SGX to create and/or access an enclave. For instance, the processor of the information handling system may include INTEL® SGX.

In one or more embodiments, processor instructions and/or data stored via a memory medium may be subjected to one or more memory medium errors. In one or more embodiments, one or more systems, one or more methods, and/or one or more processes may correct the one or more memory medium errors. In one or more embodiments, if the processor instructions and/or the data are stored via an enclave, the one or more systems, the one or more methods, and/or the one or more processes may not be able to correct a memory medium error associated with the enclave. For example, even though an enclave may provide built-in security to protect information, an enclave may not provide fault resiliency against memory medium related uncorrectable errors, which may result in data loss or data corruption of data stored via an enclave. In one or more embodiments, one or more advanced reliability and security (ADV RAS) features may be disabled in information handling system firmware when an enclave is utilized, which may prevent memory medium mirroring capabilities such as a fault resiliency mode (FRM).

In one or more embodiments, in a full memory medium mirroring mode, sizes listed in a processor reserved memory range register (PRMRR) size option in an information handling system firmware configuration may be adjusted. In one or more embodiments, in a partial memory medium mirroring mode, a PRMRR mirroring option in an information handling system firmware configuration may determine if processor reserved memory range registers (PRMRRs) are in a mirrored region or not. In one or more embodiments, all PRMRRs may be in mirrored regions or no PRMRRs may be in mirrored regions. In one or more embodiments, a total size of a protected memory medium may depend on a number of PRMRRs created in an information handling system.

In one or more embodiments, one or more memory medium regions associated with an enclave associated with an application may be fault resilient throughout a life cycle of the application. For example, the fault resiliency may be based at least on an enclave policy (e.g., enclave fault resiliency). In one or more embodiments, a number of memory medium regions in a PRMRR may be based at least on: if non-uniform memory access (NUMA) is disabled, then utilizing enclaves may be disabled; if NUMA is enabled, a sub NUMA cluster (SNC) may be disabled and a PRMRR for each processor socket may be created (e.g., for a two processor socket information handling system, with NUMA enabled and SNC disabled, two PRMRR regions may be created); and/or if NUMA is enabled and SNC is enabled, then a PRMRR region may be created per SNC. In one or more embodiments, enclave fault resiliency (EFR) may include a software defined enclave memory fault protection service. For example, a user (e.g., an administrator) may spawn an application and may set an EFR attribute, which notes fault resiliency is expected for all enclaves created by the application.

In one or more embodiments, one or more implementation of a software-defined policy may vary for different applications. In one example, an application may be executed on a virtual machine (VM). In a second example, the application may be executed on a container (e.g., an operating system virtualization instance). In another example, the application may be executed on "bare metal". For instance, when the application may be executed on "bare metal", the application may be executed on an information handling system, without being executed via an operating system virtualization instance and without being executed via a VM.

In one or more embodiments, the application may define trusted and untrusted components utilizing an enclave calls (ECALLs) and outside calls (OCALLs), respectively. For example, an enclave may communicate outside itself. In one instance, an application may invoke a subroutine (e.g., a function) inside the enclave, which may pass parameters and/or pointers to shared memory within the application. As an example, the invocations of the subroutine inside the enclave may be referred to as an enclave call (ECALL). In a second instance, when an enclave executes, the enclave may perform invoke a subroutine (e.g., a function) in the application. As an example, the invocations of the subroutine outside the enclave may be referred to as an outside call (OCALL). Different from an ECALL, an OCALL may not share enclave memory with the application, according to one or more embodiments. For example, parameters may be copied into application memory before the OCALL may be performed. In another instance, execution may exit an enclave (e.g., due to an interruption, due to an exception, etc.). As an example, an enclave exit event may be referred to an asynchronous exit event (AEX). For instance, an AEX may transfer control from the enclave to the application from an arbitrary point within the enclave.

In one or more embodiments, a change to one or more of an operating system enclave driver, an enclave creation application programming interface (API) within the enclave software development kit (SDK) API, and information handling system firmware may be implemented. For example, an attribute (e.g., ENCLS[ECREATE]) may be added to a user space execution environment API, which may be utilized when setting up and/or configuring an initial enclave creation environment and/or reserving an enclave region. For instance, along with a base address of the enclave and a size of the enclave, the API may pass the setup/configuration and an EFR value to notify an operating system driver that the application requested for enclave redundancy.

In one or more embodiments, an operating system enclave driver may read a logical address space allocated for enclaves as provided by the application for enclave creation. The operating system enclave driver may fetch one or more subroutine calls that may allocate more storage space from a memory medium. In one or more embodiments, a data structure (e.g., a table) may be created and maintained by the operating system enclave driver. For example, the data structure may store a list of enclaves that have been requested for redundancy. For instance, the data structure may be updated when an application extends and/or modifies an enclave in terms of its memory space requirements as well as redundancy at a memory medium page level.

In one or more embodiments, an enclave driver may read an EFR attribute provided by an application enclave creation request and/or may read a number of enclave memory pages committed for an enclave. For example, if a policy value is set to fault tolerant, the enclave driver may read a number of committed memory medium pages for the enclave; may begin constructing a new set of pages within an enclave page cache (EPC) range as defined in a PRMRR model specific register (MSR); and/or may copy contents of committed memory medium pages for an enclave to the memory medium pages within a PRMRR defined EPC range. In one or more embodiments, copying contents of committed memory medium pages for an enclave to the memory medium pages within a PRMRR defined EPC range may be a processor memory copy command and/or instruction. In one or more embodiments, copying contents of committed memory medium pages for an enclave to the memory medium pages within a PRMRR defined EPC range may be performed as a background process. In one or more embodiments, a redundant EPC range may be encrypted using a same processor generated hardware encryption key as an original EPC space. For example, this may enable a processor core, to which an application is executing and/or is pinned, to decrypt primary memory medium pages and associated secondary memory medium pages.

In one or more embodiments, one or more systems, one or more methods, and/or one or more processes may define a policy-based enclave fault resiliency as a software-defined manner of enclave fault resiliency. In one or more embodiments, utilizing a policy attribute defined may provide a granular manner of defining redundancy at an enclave level. In one or more embodiments, utilizing the policy attribute one or more systems, one or more methods, and/or one or more processes may mark an entire application triggered enclaves as fault resilient and/or may mark a subset of enclaves within an application as fault resilient. In one or more embodiments, one or more systems, one or more methods, and/or one or more processes may initialize secure memory medium regions based at least on NUMA nodes; may invoke ENCLS[ECREATE] with an EFR attribute; may invoke ENCLS[ECREATE]; and may determine if EFR attributes are set for ECREATE. If the EFR attributes are not set for ECREATE, the one or more systems, the one or more methods, and/or the one or more processes may follow existing enclave creation and initialization routines. If the EFR attributes are set for ECREATE, the one or more systems, the one or more methods, and/or the one or more processes may read a number of committed memory medium pages for an enclave; may construct a secondary set of pages with EPC based on a base address and offset provided by the enclave during ECREATE; may ensure a secondary set of EPC memory medium pages are placed in a different NUMA node to ensure fault resiliency; may encrypt the secondary set of EPC memory medium pages utilizing a same processor package provided key, in which the primary EPC memory medium pages are encrypted; and may implement a mirror of the EPC memory medium pages, utilizing address range partial memory mirroring.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I$^2$C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, applications (APPs) 164-166, and an OS driver 168 (e.g., an operating system enclave driver). In one or more embodiments, OS driver 168 may include a SGX driver. For example, OS driver 168 may utilize one or more structures and/or one or more functionalities of INTEL® SGX to create, maintain, and/or access an enclave. In one or more embodiments, one or more of OS 162, APPs 164-166, and OS driver 168 may include processor instructions executable by processor 120. In one example, processor 120 may execute processor instructions of one or more of OS 162, APPs 164-166, and OS driver 168 via non-volatile memory medium 160. In another example, one or more portions of the processor instructions of the one or more of OS 162, APPs 164-166, and OS driver 168 may be transferred to volatile memory medium 150, and processor 120 may execute the one or more portions of the processor instructions of the one or more of OS 162, APPs 164-166, and OS driver 168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162. In one or more embodiments, OS driver 168 may utilize the management information exchange to communicate with IHSFW 172.

In one or more embodiments, processor 120 and one or more components of IHS 110 may be included in a system-on-chip (SoC). For example, the SoC may include processor 120 and a platform controller hub (not specifically illustrated).

Figure 2:
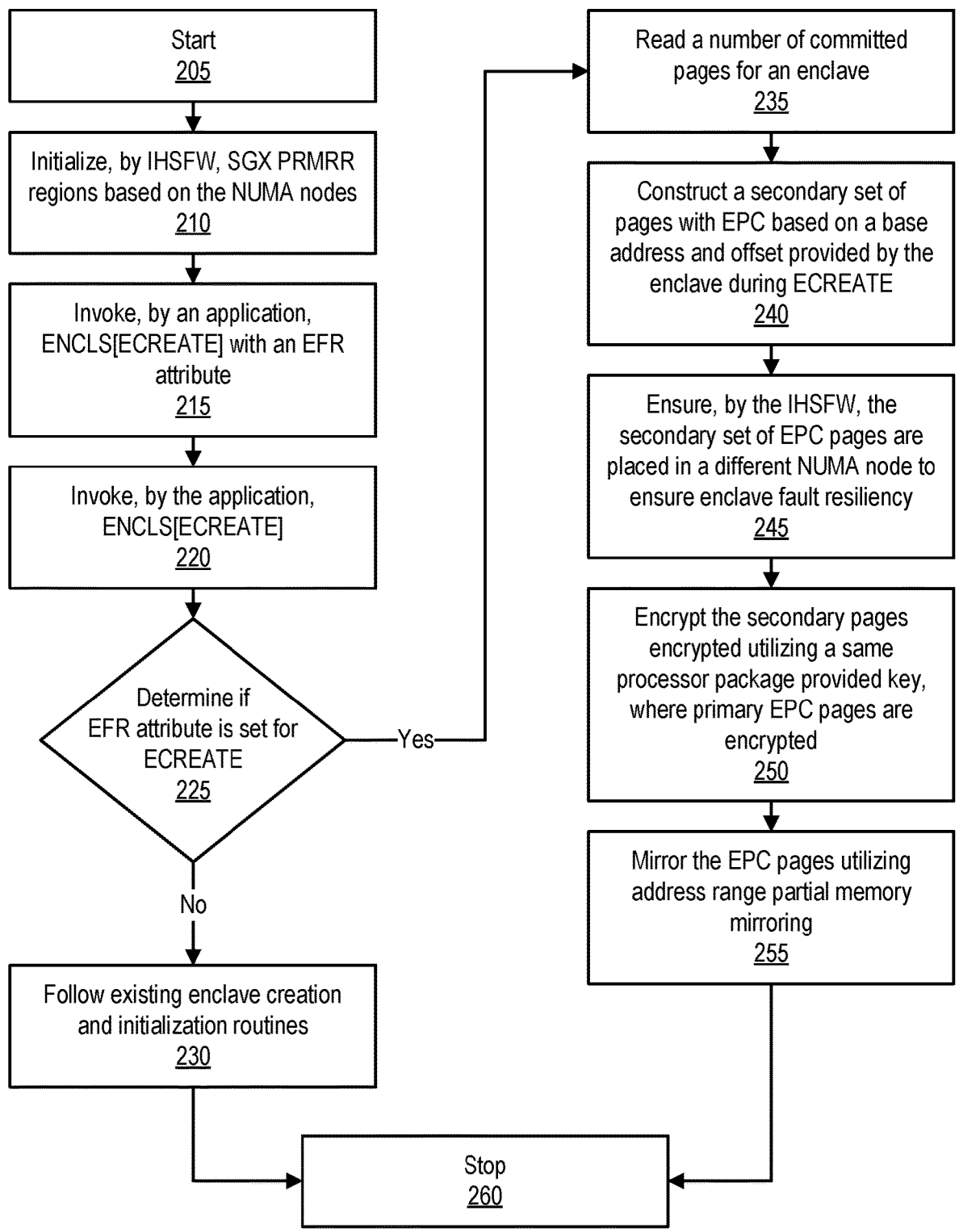
FIG. 2 illustrates an example of a method of enabling fault resiliency for user selected software guard extensions, according to one or more embodiments.

Turning now to FIG. 2, an example of a method of enabling fault resiliency for user selected software guard extensions is illustrated, according to one or more embodiments. At 205, the method may start. At 210, IHSFW 172 may initializes SGX PRMRR regions based on the NUMA nodes. For example, IHSFW 172 may allocate one or more areas of memory medium 150 for one or more PRMRR regions based at least on a number of NUMA nodes present in IHS 110. For instance, IHS 110 may include any number of NUMA nodes. In one or more embodiments, a PRMRR may be created for each NUMA of IHS 110.

At 215, an application may invoke ENCLS[ECREATE] with an EFR attribute. For example, APP 164 may invoke a subroutine, which may communicate with OS driver 168. For instance, APP 164 may provide a request an enclave with enclave fault resiliency to OS driver 168. In one or more embodiments, an enclave may securely store information for first processor instructions being executed by a processor of an information handling system at a first processor privilege level. For example, the information stored by the enclave may not be read and may not be altered (e.g., written to, written over, deleted, etc.) by second processor instructions being executed by the processor at the first processor privilege level or by third processor instructions being executed by the processor at a second processor privilege level, higher than the first processor privilege level. As such, the enclave may be called a secure enclave, according to one or more embodiments.

At 220, the application may invoke ENCLS[ECREATE]. For example, APP 164 may invoke a subroutine, which may communicate with OS driver 168. For instance, APP 164 may provide a request for an amount of storage of memory medium 150 for the enclave to OS driver 168. At 225, it may be determined if the EFR attribute is set for ECREATE. For example, OS driver 168 may determine if the EFR attribute is set for ECREATE.

If the EFR attribute is set for ECREATE is not set, existing enclave creation and initialization routines may be followed. For example, an enclave without enclave fault resiliency may be created. In one or more embodiments, the method may proceed to 260, where the method may stop, according to one or more embodiments. If the EFR attribute is set for ECREATE is set, a number of committed pages for an enclave may be read, at 235. For example, OS driver 168 may read a number of committed pages of memory medium 150 for an enclave.

At 240, a secondary set of pages with EPC may be constructed based on a base address and offset provided by the enclave during ECREATE. At 245, IHSFW 172 may ensure that the secondary set of EPC pages are placed in a different NUMA node to ensure enclave fault resiliency. At 250, the secondary pages may be encrypted utilizing a same processor package provided key, where primary EPC pages are encrypted. At 255, the EPC pages may mirror the EPC pages utilizing address range partial memory mirroring. For example, OS driver 168 may mirror the EPC pages utilizing address range partial memory mirroring. In one or more embodiments, the method may proceed to 260, where the method may stop, according to one or more embodiments.

Figure 3:
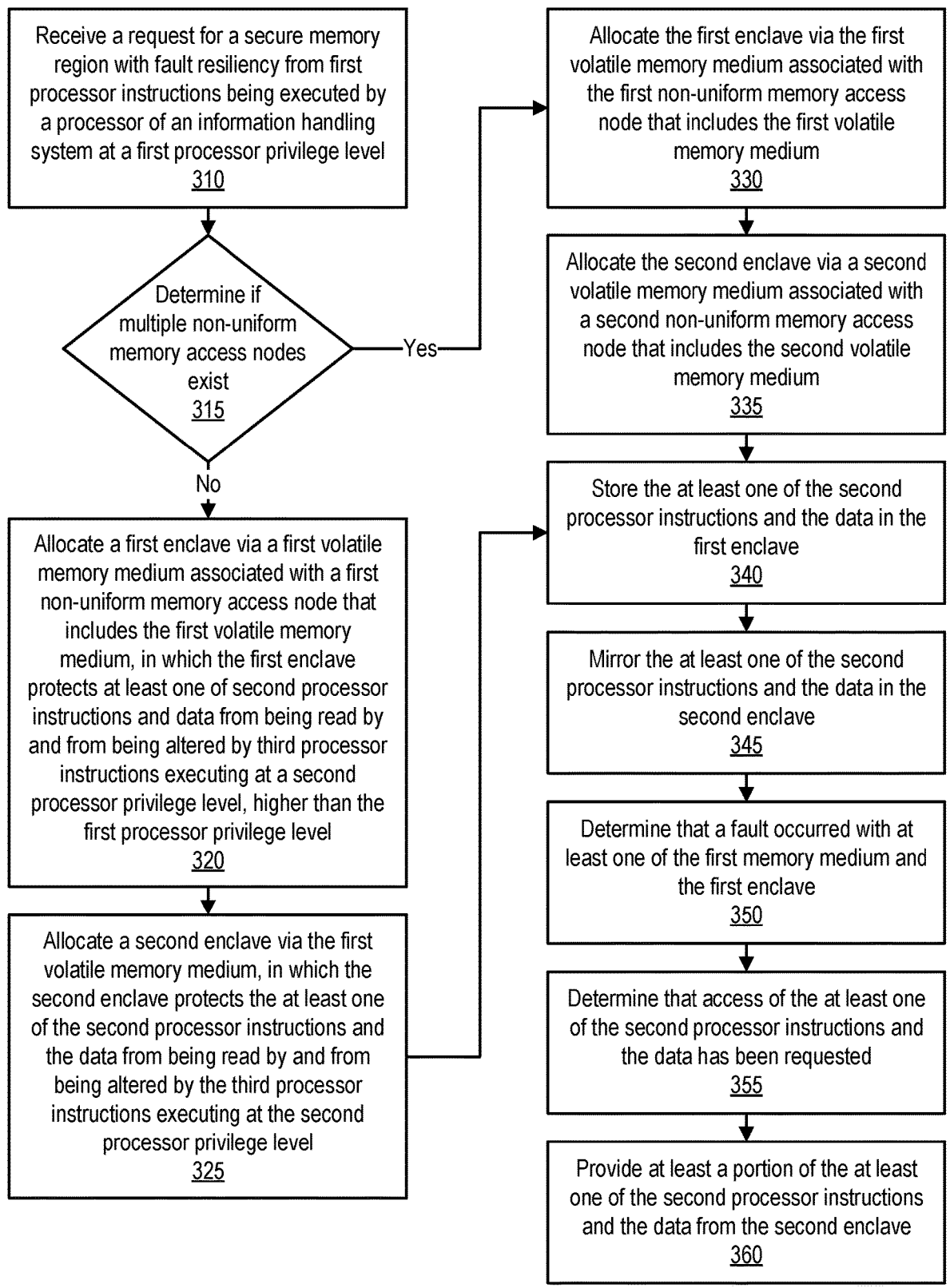
FIG. 3 illustrates an example of a method of operating an information handling system, according to one or more embodiments.

Turning now to FIG. 3, an example of a method of operating an information handling system is illustrated, according to one or more embodiments. At 310, a request for a secure memory region with fault resiliency may be received from first processor instructions being executed by a processor of an information handling system at a first processor privilege level. In one or more embodiments, receiving the request for the secure memory region with fault resiliency from the first processor instructions may include an operating system enclave driver (e.g., OS driver 168) receiving the request for the secure memory region with fault resiliency from the first processor instructions. For example, the operating system enclave driver may provide the request for the secure memory region with fault resiliency to information handling system firmware via a management information exchange. For instance, the operating system enclave driver may provide the request for the secure memory region with fault resiliency to information handling system firmware via at least one of a WMI and a CIM, among others.

Figure 4A:
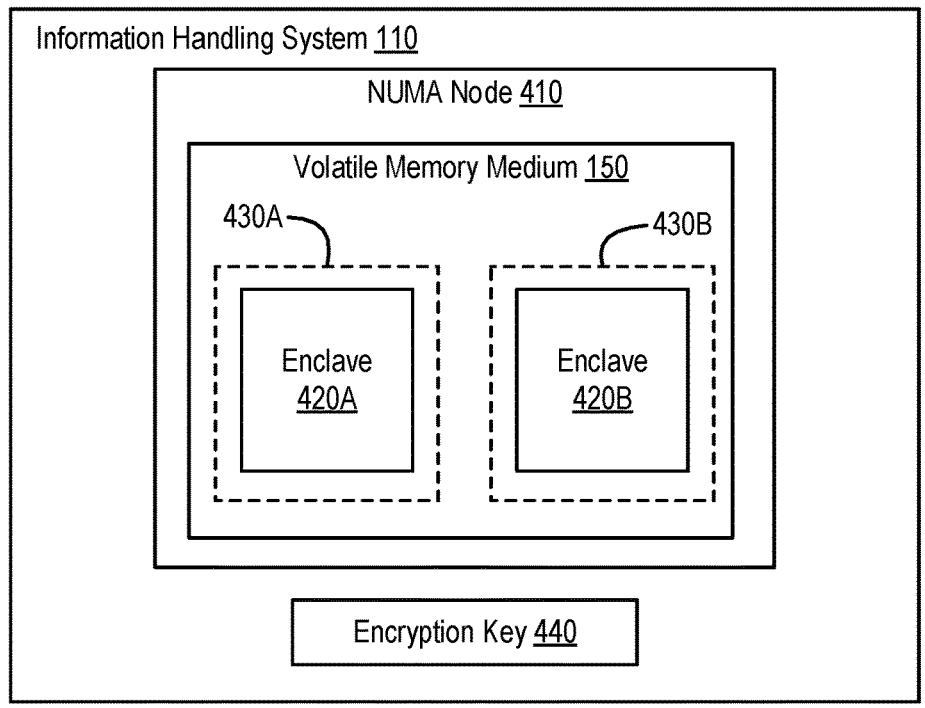
FIG. 4A illustrates an example of an information handling system that includes a single non-uniform memory access node, according to one or more embodiments.
Figure 4B:
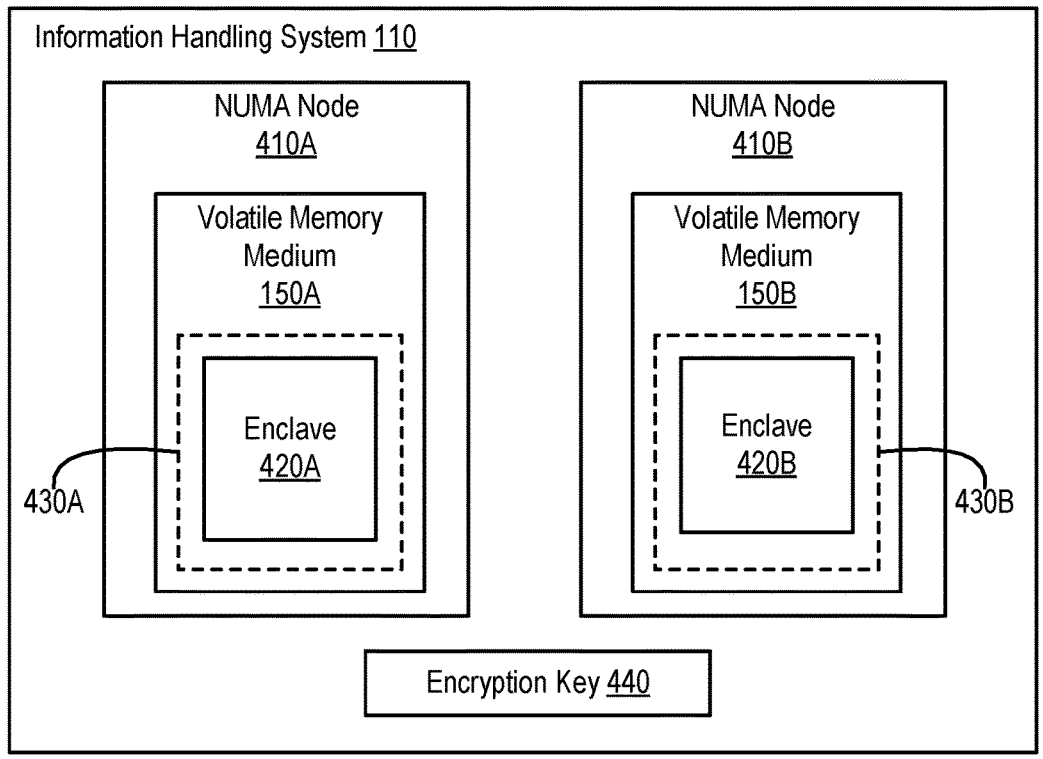
FIG. 4B illustrates an example of an information handling system that includes multiple non-uniform memory access nodes, according to one or more embodiments.

At 315, it may be determined if multiple non-uniform memory access nodes exist. As an example, IHS 110 may include a single non-uniform memory access node. For instance, IHS 110 may include a single NUMA node 410, as illustrated in FIG. 4A. As another example, IHS 110 may include multiple non-uniform memory access nodes. For instance, IHS 110 may include NUMA nodes 410A and 410B, as shown in FIG. 4B.

If the multiple non-uniform memory access nodes do not exist, a first enclave may be allocated via a first volatile memory medium associated with a first non-uniform memory access node that includes the first volatile memory medium, in which the first enclave protects at least one of second processor instructions and data from being read by and from being altered by third processor instructions executing at a second processor privilege level, higher than the first processor privilege level, at 320. For example, as illustrated in FIG. 4A, a first enclave 420A may be allocated via volatile memory medium 150 associated with non-uniform memory access node 410 that includes volatile memory medium 150. For instance, first enclave 420A may protect the at least one of the second processor instructions and the data from being read by and from being altered by third processor instructions executing at a second processor privilege level, higher than the first processor privilege level. In one or more embodiments, the third processor instructions executing at the second processor privilege level may include at least one of a virtual machine and an operating system virtualization instance, among others. In one or more embodiments, allocating the first enclave via the first volatile memory medium may include allocating multiple pages of the first volatile memory medium. For example, as shown in FIG. 4A, multiple pages 430A of volatile memory medium 150 may be allocated. For instance, multiple pages 430A may be utilized to store first enclave 420A. In one or more embodiments, the second processor instructions may include at least a portion of the first processor instructions. In one or more embodiments, the second processor instructions may be different from at least a portion of the first processor instructions. In one or more embodiments, at a portion of the first processor instructions and/or at a portion the second processor instructions may be different from the third processor instructions. In one or more embodiments, the third processor instructions may include at a portion of the first processor instructions and/or at a portion the second processor instructions.

With reference again to FIG. 3, at 325, a second enclave may be allocated via the first volatile memory medium, in which the second enclave protects the at least one of the second processor instructions and the data from being read by and from being altered by the third processor instructions executing at the second processor privilege level. For example, as illustrated in FIG. 4A, a second enclave 420B may be allocated via volatile memory medium 150. For instance, second enclave 420A may protect the at least one of the second processor instructions and the data from being read by and from being and from being altered by the third processor instructions executing at the second processor privilege level. In one or more embodiments, allocating the second enclave via the first volatile memory medium may include allocating multiple pages of the first volatile memory medium. For example, as shown in FIG. 4A, multiple pages 430B of volatile memory medium 150 may be allocated. For instance, multiple pages 430B may be utilized to store second enclave 420B.

In one or more embodiments, it may be determined that the request for the secure memory region with the fault resiliency includes an attribute that is set to indicate that the at least one of the second processor instructions and the data in the second enclave are to be mirrored in the second enclave. For example, receiving the request for the secure memory region with fault resiliency from the first processor instructions includes receiving the request for the secure memory region with fault resiliency from the first processor instructions via an API, in which the API supports the attribute.

With reference again to FIG. 3, the method may proceed to 340, according to one or more embodiments. If the multiple non-uniform memory access nodes exist, the first enclave may be allocated via the first volatile memory medium associated with the first non-uniform memory access node that includes the first volatile memory medium, at 330. For example, as illustrated in FIG. 4B, first enclave 420A may be allocated via a volatile memory medium 150A associated with non-uniform memory access node 410A that includes volatile memory medium 150A. For instance, first enclave 420A may protect the at least one of the second processor instructions and the data from being read by and from being altered by the third processor instructions executing at the second processor privilege level, higher than the first processor privilege level. In one or more embodiments, allocating the first enclave via the first volatile memory medium may include allocating multiple pages of the first volatile memory medium. For example, as shown in FIG. 4B, multiple pages 430A of volatile memory medium 150A may be allocated. For instance, multiple pages 430A may be utilized to store first enclave 420A.

With reference again to FIG. 3, at 335, the second enclave may be allocated via a second volatile memory medium associated with a second non-uniform memory access node that includes the second volatile memory medium. For example, as illustrated in FIG. 4B, second enclave 420B may be allocated via a volatile memory medium 150B. For instance, second enclave 420A may protect the at least one of the second processor instructions and the data from being read by and from being and from being altered by the third processor instructions executing at the second processor privilege level. In one or more embodiments, allocating the second enclave via the second volatile memory medium may include allocating multiple pages of the second volatile memory medium. For example, as shown in FIG. 4B, multiple pages 430B of volatile memory medium 150B may be allocated. For instance, multiple pages 430B may be utilized to store second enclave 420B.

With reference again to FIG. 3, at 340, the at least one of the second processor instructions and the data may be stored in the first enclave. For example, the at least one of the second processor instructions and the data may be stored in first enclave 420A. At 345, the at least one of the second processor instructions and the data may be mirrored in the second enclave. For example, the at least one of the second processor instructions and the data may be mirrored in second enclave 420B. In one or more embodiments, mirroring the at least one of the second processor instructions and the data in the second enclave may include copying the at least one of the second processor instructions and the data to the second enclave.

In one or more embodiments, the at least one of the second processor instructions and the data may be encrypted and decrypted via an encryption key. For example, as illustrated in FIGS. 4A and 4B, IHS 110 may include an encryption key 440. For instance, the at least one of the second processor instructions and the data, stored via enclaves 420A and 420B, may be encrypted and decrypted via encryption key 440. As an example, the at least one of the second processor instructions and the data, stored via enclaves 420A and 420B, may be encrypted and decrypted via respective hardware-based encryption and hardware-based decryption that utilizes encryption key 440. For instance, processor 120 may include hardware-based encryption methods and/or may include hardware-based decryption methods.

In one or more embodiments, protecting the at least one of the second processor instructions and the data from being read by and from being altered by the third processor instructions executing at the second processor privilege level may include encrypting the at least one of the second processor instructions and the data via the encryption key. For example, the encryption key may not be accessed by the third processor instructions. For instance, the encryption key may not be accessed by the third processor instructions executing at any processor privilege level.

With reference again to FIG. 3, at 350, it may be determined that a fault occurred with at least one of the first memory medium and the first enclave. At 355, it may be determined that access of the at least one of the second processor instructions and the data has been requested. At 360, at least a portion of the at least one of the second processor instructions and the data may be provided from the second enclave. In one or more embodiments, providing the at least the portion of the at least one of the second processor instructions and the data from the second enclave may be performed in response to at least one of determining that access of the at least one of the second processor instructions and the data has been requested and determining that access of the at least one of the second processor instructions and the data has been requested.

In one or more embodiments, the operating system enclave driver may create a data structure configured to store a list of enclaves that have been requested for redundancy. The operating system enclave driver may further receive a request for additional storage space for the secure memory region. The operating system enclave driver may extend the first enclave to include the additional storage space for the secure memory region and may extend the second enclave to include the additional storage space for the secure memory region. The operating system enclave driver may further modify the data structure to include an indication of the additional storage space for the secure memory region.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor;
one or more non-uniform memory access nodes; and
a memory medium, coupled to the at least one processor, that stores instructions executable by the at least one processor, which when executed by the at least one processor, cause the information handling system to:
receive a request for a secure memory region from first processor instructions being executed by the at least one processor at a first processor privilege level, wherein the request for the secure memory region further comprises an enclave fault resiliency (EFR) attribute;

provide, by an operating system driver, the request for the secure memory to information handling system firmware, which is compliant with at least one of a Unified Extensible Firmware Interface (UEFI) and an Advanced Configuration and Power Interface (ACPI), via a management information exchange;

determine, based on the EFR attribute, if the request for the secure memory region further comprises a request for fault resiliency;

determine, from the one or more non-uniform memory access nodes, if a plurality of non-uniform memory access nodes exist;

if the plurality of non-uniform memory access nodes do not exist:

allocate, via the operating system driver and the information handling system firmware, a first enclave via a first volatile memory medium associated with a first non-uniform memory access node that includes the first volatile memory medium, wherein the first enclave protects at least one of second processor instructions and data from being read by and from being altered by third processor instructions executing at a second processor privilege level, higher than the first processor privilege level; and if the request for the secure memory region further comprises a request for fault resiliency, allocate, via the operating system driver and the information handling system firmware, a second enclave via the first volatile memory medium, wherein the second enclave protects the at least one of the second processor instructions and the data from being read by and from being altered by the third processor instructions executing at the second processor privilege level;

if the plurality of non-uniform memory access nodes exist:

allocate, via the operating system driver and the information handling system firmware, the first enclave via the first volatile memory medium associated with the first non-uniform memory access node that includes the first volatile memory medium; and if the request for the secure memory region further comprises a request for fault resiliency, allocate, via the operating system driver and the information handling system firmware, the second enclave via a second volatile memory medium associated with a second non-uniform memory access node that includes the second volatile memory medium;

encrypt, by hardware-based encryption, the at least one of the second processor instructions and the data via an encryption key that is stored by the information handling system, external to the first enclave and not accessed by the third processor instructions executing at any processor privilege level, wherein if the request for the secure memory region further comprises a request for fault resiliency, the encryption key is stored external to the first enclave and external to the second enclave;

store the at least one of the second processor instructions and the data, as encrypted by the encryption key, in the first enclave; and if the request for the secure memory region further comprises a request for fault resiliency, mirror the at least one of the second processor instructions and the data, as encrypted by the encryption key, in the second enclave.

2. The information handling system of claim 1, wherein the instructions further cause the information handling system to:

determine that additional data is stored in the first enclave; and in response to determining that the additional data is stored in the first enclave, mirror the additional data in the second enclave.

3. The information handling system of claim 1, wherein if the request for the secure memory region further comprises a request for fault resiliency, the instructions further cause the information handling system to:

determine that a fault occurred with at least one of the first memory medium and the first enclave;

determine that access of the at least one of the second processor instructions and the data has been requested; and provide at least a portion of the at least one of the second processor instructions and the data from the second enclave.

4. The information handling system of claim 1, wherein the third processor instructions executing at the second processor privilege level include at least one of a virtual machine and an operating system virtualization instance.

5. The information handling system of claim 1, wherein the instructions further cause the information handling system to:

disable one or more advanced reliability and security (ADV RAS) features if the request for the secure memory region further comprises a request for fault resiliency.

6. The information handling system of claim 1, wherein, to receive the request for the secure memory region from the first processor instructions, further cause the information handling system to receive, by an operating system enclave driver, the request for the secure memory region;

wherein the operating system driver is the operating system enclave driver; and wherein, to provide, by the operating system driver, the request for the secure memory region to the information handling system firmware via the management information exchange, the instructions further cause the information handling system to provide, by the operating system enclave driver, the request for the secure memory region to the information handling system firmware via the management information exchange.

7. The information handling system of claim 1, wherein the instructions further cause the information handling system to:

create, by an operating system enclave driver, a data structure configured to store a list of enclaves that have been requested for redundancy;

receive, by the operating system enclave driver, a request for additional storage space for the secure memory region;

extend, by the operating system enclave driver, the first enclave to include the additional storage space for the secure memory region;

extend, by the operating system enclave driver, the second enclave to include the additional storage space for the secure memory region; and modify, by the operating system enclave driver, the data structure to include an indication of the additional storage space for the secure memory region.

8. A method, comprising:

receiving a request for a secure memory region from first processor instructions being executed by a processor of an information handling system, which includes one or more non-uniform memory access nodes, at a first processor privilege level, wherein the request for the secure memory region further comprises an enclave fault resiliency (EFR) attribute;

providing, by an operating system driver, the request for the secure memory region to information handling system firmware, which is compliant with at least one of a Unified Extensible Firmware Interface (UEFI) and an Advanced Configuration and Power Interface (ACPI), via a management information exchange;

determining, based on the EFR attribute, that the request for the secure memory region further comprises a request for fault resiliency;

determining, from the one or more non-uniform memory access nodes, that a plurality of non-uniform memory access nodes do not exist;

allocating, via the information handling system firmware, a first enclave via a first volatile memory medium associated with a first non-uniform memory access node that includes the first volatile memory medium, wherein the first enclave protects at least one of second processor instructions and data from being read by and from being altered by third processor instructions executing at a second processor privilege level, higher than the first processor privilege level;

in response to the request for the secure memory region further comprising a request for fault resiliency, allocating, via the information handling system firmware, a second enclave via the first volatile memory medium, wherein the second enclave protects the at least one of the second processor instructions and the data from being read by and from being altered by the third processor instructions executing at the second processor privilege level;

encrypting, by hardware-based encryption, the at least one of the second processor instructions and the data via an encryption key that is stored by the information handling system, external to the first enclave and not accessed by the third processor instructions executing at any processor privilege level, wherein in response to the request for the secure memory region further comprising a request for fault resiliency, the encryption key is stored external to the first enclave and external to the second enclave;

storing the at least one of the second processor instructions and the data, as encrypted by the encryption key, in the first enclave; and in response to the request for the secure memory region further comprising a request for fault resiliency, mirroring the at least one of the second processor instructions and the data, as encrypted by the encryption key, in the second enclave.

9. The method of claim 8, further comprising:

determining that additional data is stored in the first enclave; and in response to the determining that the additional data is stored in the first enclave, mirroring the additional data in the second enclave.

10. The method of claim 8, further comprising, in response to the request for the secure memory region further comprising a request for fault resiliency:

determining that a fault occurred with at least one of the first memory medium and the first enclave;

determining that access of the at least one of the second processor instructions and the data has been requested; and providing at least a portion of the at least one of the second processor instructions and the data from the second enclave.

11. The method of claim 8, wherein the third processor instructions executing at the second processor privilege level include at least one of a virtual machine and an operating system virtualization instance.

12. The method of claim 8, further comprising:

disabling one or more advanced reliability and security (ADV RAS) features in response to the request for the secure memory region further comprising a request for fault resiliency.

13. The method of claim 8, wherein the receiving the request for the secure memory region from the first processor instructions includes an operating system enclave driver receiving the request for the secure memory region from the first processor instructions;

wherein the operating system driver is the operating system enclave driver; and wherein the providing, by the operating system driver, the request for the secure memory region to information handling system firmware via the management information exchange includes providing, by the operating system enclave driver, the request for the secure memory region to information handling system firmware via the management information exchange.

14. The method of claim 8, further comprising:

creating, by an operating system enclave driver, a data structure configured to store a list of enclaves that have been requested for redundancy;

receiving, by the operating system enclave driver, a request for additional storage space for the secure memory region;

extending, by the operating system enclave driver, the first enclave to include the additional storage space for the secure memory region;

extending, by the operating system enclave driver, the second enclave to include the additional storage space for the secure memory region; and modifying, by the operating system enclave driver, the data structure to include an indication of the additional storage space for the secure memory region.

15. A computer-readable non-transitory memory medium that includes instructions that, when executed by at least one processor of an information handling system, cause the information handling system to:

receive a request for a secure memory region from first processor instructions being executed by the at least one processor at a first processor privilege level, wherein the request for the secure memory region further comprises an enclave fault resiliency (EFR) attribute;

provide the request for the secure memory region to information handling system firmware, which is compliant with at least one of a Unified Extensible Firmware Interface (UEFI) and an Advanced Configuration and Power Interface (ACPI), via a management information exchange;

determining, based on the EFR attribute, if the request for the secure memory region further comprises a request for fault resiliency;

determine, from the one or more non-uniform memory access nodes, if a plurality of non-uniform memory access nodes exist;

if the plurality of non-uniform memory access nodes do not exist:

allocate, via the information handling system firmware, a first enclave via a first volatile memory medium associated with a first non-uniform memory access node that includes the first volatile memory medium, wherein the first enclave protects at least one of second processor instructions and data from being read by and from being altered by third processor instructions executing at a second processor privilege level, higher than the first processor privilege level; and if the request for the secure memory region further comprises a request for fault resiliency, allocate, via the information handling system firmware, a second enclave via the first volatile memory medium, wherein the second enclave protects the at least one of the second processor instructions and the data from being read by and from being altered by the third processor instructions executing at the second processor privilege level;

if the plurality of non-uniform memory access nodes exist:

allocate, via the information handling system firmware, the first enclave via the first volatile memory medium associated with the first non-uniform memory access node that includes the first volatile memory medium; and if the request for the secure memory region further comprises a request for fault resiliency, allocate, via the information handling system firmware, the second enclave via a second volatile memory medium associated with a second non-uniform memory access node that includes the second volatile memory medium;

encrypt, by hardware-based encryption, the at least one of the second processor instructions and the data via an encryption key that is stored by the information handling system, external to the first enclave and not accessed by the third processor instructions executing at any processor privilege level, wherein if the request for the secure memory region further comprises a request for fault resiliency, the encryption key is stored external to the first enclave and external to the second enclave;

store the at least one of the second processor instructions and the data, as encrypted by the encryption key, in the first enclave; and if the request for the secure memory region further comprises a request for fault resiliency, mirror the at least one of the second processor instructions and the data, as encrypted by the encryption key, in the second enclave.

16. The computer-readable non-transitory memory medium of claim 15, wherein the instructions further cause the information handling system to:

determine that additional data is stored in the first enclave; and in response to determining that the additional data is stored in the first enclave, mirror the additional data in the second enclave.

17. The computer-readable non-transitory memory medium of claim 15, wherein if the request for the secure memory region further comprises a request for fault resiliency, the instructions further cause the information handling system to:

determine that a fault occurred with at least one of the first memory medium and the first enclave;

determine that access of the at least one of the second processor instructions and the data has been requested; and provide at least a portion of the at least one of the second processor instructions and the data from the second enclave.

18. The computer-readable non-transitory memory medium of claim 15, wherein the third processor instructions executing at the second processor privilege level include at least one of a virtual machine and an operating system virtualization instance.

19. The computer-readable non-transitory memory medium of claim 15, wherein the instructions further cause the information handling system to disable one or more advanced reliability and security (ADV RAS) features if the request for the secure memory region further comprises a request for fault resiliency.

20. The computer-readable non-transitory memory medium of claim 15, wherein the instructions further cause the information handling system to:

create, by an operating system enclave driver, a data structure configured to store a list of enclaves that have been requested for redundancy;

receive, by the operating system enclave driver, a request for additional storage space for the secure memory region;

extend, by the operating system enclave driver, the first enclave to include the additional storage space for the secure memory region;

extend, by the operating system enclave driver, the second enclave to include the additional storage space for the secure memory region; and modify, by the operating system enclave driver, the data structure to include an indication of the additional storage space for the secure memory region.

\* \* \* \* \*